United States Patent [19]

Satoh et al.

[11] E Patent Number: Re. 32,230

[45] Reissued Date of Patent: Aug. 26, 1986

[54] RUBBER HOSE FOR AUTOMOTIVE FUEL LINE

[75] Inventors: Seikoh Satoh, Yokohama; Tadashi Suzuki, Gojo, both of Japan

[73] Assignee: Nissan Motor Co., Ltd., Yokohama, Japan

[21] Appl. No.: 607,584

[22] Filed: May 7, 1984

Related U.S. Patent Documents

Reissue of:

[64] Patent No.: 4,330,017
Issued: May 18, 1982
Appl. No.: 71,291
Filed: Aug. 30, 1979

U.S. Applications:

[63] Continuation-in-part of Ser. No. 896,084, Apr. 13, 1978, abandoned.

[30] Foreign Application Priority Data

Apr. 22, 1977 [JP] Japan ..... 52-52133

[51] Int. Cl.[4] ..... F16L 11/04

[52] U.S. Cl. ..... 138/126; 138/123; 138/124; 138/125; 138/127; 138/137; 138/DIG. 3

[58] Field of Search ..... 138/123, 124, 125, 126, 138/127, 137, 141, 145, 146, DIG. 3; 428/36

[56] References Cited

U.S. PATENT DOCUMENTS

| | | | |
|---|---|---|---|
| 2,160,371 | 5/1939 | Schnabel | 138/137 X |
| 2,773,781 | 12/1956 | Rodman | 138/DIG. 3 |
| 2,971,538 | 2/1961 | Brumbach | 138/137 X |
| 3,109,461 | 11/1963 | Wolff et al. | 138/137 |
| 3,411,981 | 11/1968 | Thomas | 138/141 |
| 3,561,493 | 2/1971 | Maillard et al. | 138/137 X |
| 3,828,112 | 8/1974 | Johansen et al. | 138/127 X |
| 3,944,453 | 3/1976 | Chudgar et al. | 138/125 X |
| 4,041,207 | 8/1977 | Takada et al. | 428/36 X |

*Primary Examiner*—James E. Bryant, III
*Attorney, Agent, or Firm*—Schwartz, Jeffery, Schwaab, Mack, Blumenthal & Evans

[57] ABSTRACT

An automotive fuel hose comprising a two-ply rubber tube covered with a reinforcing fiber layer and further with a protective rubber layer. The two-ply rubber tube is constituted of a very thin inner layer of a fluorine rubber resistant to fuel, even to sour gasoline, and an outer layer of a synthetic rubber, such as epichlorohydrin rubber or ethylene-acrylic rubber, which is less resistant to sour gasoline but is superior in cold resistance. Both the inner and outer layers are formed by extrusion, preferably simultaneously.

10 Claims, 3 Drawing Figures

RUBBER HOSE FOR AUTOMOTIVE FUEL LINE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application Ser. No. 896,084 filed Apr. 13, 1978 now abandoned.

BACKGROUND OF THE INVENTION

In conventional automotive fuel hoses, usually nitrile rubber (acrylonitrile-butadiene rubber) is utilized as a fundamental material of an innermost layer of the hoses and chloroprene rubber as a covering material.

A trend in recent automobiles is considerable complication of their fuel systems due to the employment of various measures to achieve satisfactory control of exhaust emission. In many recent automobiles, therefore, gasoline flowing through the fuel line is liable to undergo a considerable rise in its temperature by the influence of exhaust emission control means. Then, there is a strong possibility that the heated gasoline is partially oxidized to form so-called sour gasoline which is highly erosive to many organic materials including synthetic rubbers. In automobiles where the fuel system is of the fuel injection type, an erosive action of sour gasoline on the material of fuel hose is further promoted by the pressure applied to the fuel. When such changes in the condition of the fuel is taken into consideration, nitrile rubber as the fuel hose material is no longer satisfactory in its heat resistance and oxidation resistance. In other words, there arises a problem that automotive fuel hoses which employ nitrile rubber as the fundamental material cannot be expected to have a sufficient service life. Since deterioration of the fuel hose is liable to result in fuel leak and hence constitutes a serious danger, now it is necessary to utilize a fuel hose having a sufficient resistance to sour gasoline.

Under such a situation, attention has been given to relatively recently developed synthetic rubbers, particularly to fluorine rubber (fluorine-containing hydrocarbon elastomer) and epichlorohydrin rubber, as fuel hose materials superior to nitrile rubber in heat- and solvent-resistance. However, practical applications of these new candidates to commercial fuel hoses have encountered problems because of each of these new rubbers has not only merits but also certain demerits.

Fluorine rubber is excellent in heat resistance and solvent resistance and has been regarded as sufficiently resistant even to sour gasoline. However, fluorine rubber is too costly to use as a material for a component of mass-produced automobiles. For example, it costs about twenty times more than nitrile rubber conventionally used for automotive fuel hoses. Moreover, fluorine rubber is not fully satisfactory in its resistance to cold. The practicability of fluorine rubber currently available as a hose material at low temperatures is limited to the level of about −25° C. or about −30° C. at the best, while automotive fuel hoses must be expected to experience not only considerably high temperatures, even above 100° C., in engine rooms but also very low temperatures such as −40° C., or below during operation in cold terrains. There is a possiblity to obtain a special type of fluorine rubber whose cold resistance extends to −49° C. or below, but the price of such rubber will be five to ten times as high as that of currently marketed ordinary fluorine rubber.

Epichlorohydrin rubber is relatively low in price and excellent in cold resistance but is rather poor in its resistance to oxidized fuel, particularly, in a heated state. When this rubber is long kept in contact with a hot and oxidized gasoline, it tends to soften and lose its resiliency, and this tendency is promoted where the fuel is pressurized. Therefore, it will be impermissible to use epichlorohydrin rubber as the material for an innermost layer of an automotive fuel hose.

Some synthetic resins other than synthetic rubbers have also been used for conveyance of organic liquids. As an example of tubular laminates utilizing a synthetic resin, Japanese Utility Model Application Publication No. 49(1974)-7938 shows a "hose" comprising a tube of a synthetic resin such as nylon or Teflon as the innermost layer of a relatively small thickness and a tubular rubber layer of a larger thickness covering the outside of the resin tube. (No description is given about the type of the rubber for the covering layer.) Certainly this type of hose will be excellent in resistance to heat and solvent. However, this hose cannot have a sufficient flexibility even though the inner tube has a considerably small wall-thickness since neither nylon nor Teflon exhibits rubbery or elastomeric behavior. It is not proposed to use this hose as an automotive fuel hose. If it is intended to construct an automotive fuel line by using this hose, it will be necessary to employ specially designed and probably complicated types of clamps and bandage tubes for the purpose of surely precluding the occurrence of fuel leak during long operation of the fuel system, because this hose is inferior to true rubber hoses in rubbery resiliency, flexibility, bendability and the extent of elongation within the limit of elasticity. Even when such a measure is taken, there will remain a fear that mechanical vibrations imposed on the fuel line will cause distortion or loosening of couplings of the hose with metal conduits and resultant leakage of fuel. Besides, this hose will suffer an insufficient durability due to a separation tendency of its rubber covering layer from the synthetic resin tube. Therefore, this type of hose is unsuitable for automotive uses.

SUMMARY OF THE INVENTION

It is an object of the present invention to provide an automotive fuel hose which is excellent in its resistance to sour gasoline and also in other properties required for an automotive fuel hose such as heat resistance, cold resistance, flexibility, bendability and endurance to vibrations and other mechanical stresses and, furthermore, which can be manufactured industrially at a reasonable cost.

A fuel hose according to the invention is a rubber hose comprising, as its fundamental part, a two-ply rubber tube which is constituted of an inner layer of a fluorine rubber as an innermost layer of the hose and an outer layer of a different type of synthetic rubber which is less resistant to fuel, particularly to sour gasoline, than the fluorine rubber but is superior in cold resistance to the fluorine rubber. As an important requirement, the thickness of the innermost fluorine rubber layer is in the range from about 0.2 mm to about 0.7 mm, while the outer layer of the different synthetic rubber has a thickness ranging from about 0.5 mm to about 1.0 mm and, preferably, is thicker than the innermost layer. Both the inner and outer rubber layers are formed by extrusion such that the outer layer bonds to the inner layer over the entire area. Furthermore, this hose has a tubular reinforcing layer of a heat-resistant fibrous material intimately covering the outer layer of the two-ply rubber tube and a tubular protective covering of a synthetic rubber on the outside of the reinforcing layer.

With consideration of physical properties and the cost of material, epichlorohydrin rubber or ethylene-acrylic rubber is the most preferable as the material of the outer layer of the two-ply rubber tube.

As mentioned hereinbefore, heretofore it has already been conceived to use fluorine rubber as the fundamental material of a fuel hose. Aside from the use of fluorine rubber, rubber or plastic hoses and pipes having a double-layer structure are also known. However, the present invention is neither a mere addition of an outer rubber layer to a fluorine rubber hose of a primitive concept nor a simple choice of fluorine rubber as the material of the innermost layer in a known rubber hose having a double-layer structure. The fuel hose according to the invention is characterized principally by an unusually small thickness of the fluorine rubber layer as specified above. According to the expertise of rubber fuel hose designers, it is dangerous to make the wall thickness of a fluorine rubber hose less than 1 mm even when the fluorine rubber tube is covered with an outer protective or reinforcing layer of a different material. This is due to the fact that even fluorine rubber is gradually eroded by sour gasoline to a certain extent, and it is inevitable that a small quantity of sour gasoline or its vapor will permeate through a thin fluorine rubber layer. Thus it has been considered that a substantial reduction of the rubber layer thickness in a fluorine rubber fuel hose will result in the permeation of a considerable quantity of sour gasoline or its vapor through the fluorine rubber layer and, as a natural consequence, in a significant erosion of the outer layer which is formed of a material not resistant to sour gasoline. Therefore, heretofore nobody has considered to produce a fuel hose having a rubber layer of which thickness is less than b 1 mm, despite a very high price of fluorine rubber.

We have made a surprising discovery that when sour gasoline or its vapor permeates through a fluorine rubber layer the permeated sour gasoline undergoes a certain change in its chemical nature, presumably because fluorine rubber exhibits a chemical screen effect on sour gasoline. More particularly, there occurs a surprising lowering of peroxide concentration during permeation of sour gasoline through a fluorine rubber layer even when this layer has a considerably small thickness, so that the permeated gasoline is no longer erosive to a less expensive rubber such as epichlorohydrin rubber or ethylene-acrylic rubber. A more detailed description about this phenomenon will be given hereinafter.

The present invention is based on the discovery of such an unexpected phenomenon and provides a fuel hose which utilizes fluorine rubber but, nevertheless, can be manufactured and marketed at a tolerable price from an industrial viewpoint and which is fully safe and long-lasting even when used in an automotive fuel line in which gasoline flows in a heated and pressurized state. Of course, this hose is fully satisfactory also in other properties normally required for an automotive fuel hose. Besides the above described action on sour gasoline, the innermost fluorine rubber layer of this hose is excellent in resistance to solvent, oxidation and heat. The outer layer of the two-ply rubber tube makes up for insufficiency in cold resistance of the fluorine rubber layer, augments the physical strength of the rubber tube and affords the tube a sufficient resistance to constriction. Since this hose is made up of rubbers and fibrous materials, this hose has good flexibility, rubbery resiliency, bendability and large elongation within the limit of elasticity. Accordingly this hose is distinctly advantageous over a hose comprising an inner tube of a non-rubber synthetic resin, particularly in having a good vibration-absorbing property and a very reliable sealing ability even in the case of a pressurized fuel being conveyed therethrough and in the capability of being assembled into a fuel line by using only simple clamping means.

DESCRIPTION OF THE PREFERRED EMBODIMENTS

Figure 1:
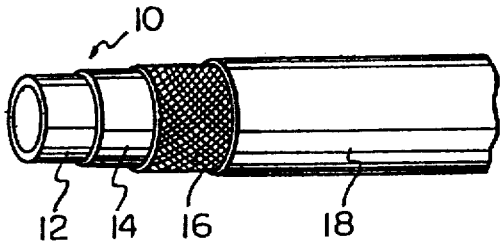
FIG. 1 is a partly cutaway perspective view of a fuel hose according to the invention.

Referring to FIG. 1, a two-ply rubber tube 10 according to the invention is constituted of a tubular inner layer 12 and a tubular outer layer 14 which is intimately bonded to the outside of the inner layer 12 over the entire area. The inner layer 12 is formed of a fluorine rubber and has a relatively small thickness ranging from about 0.2 mm to about 0.7 mm. The outer layer 14 is formed of a synthetic rubber cheaper than fluorine rubber and superior in, at least, cold resistance to the fluorine rubber of the inner layer 12. As mentioned hereinbefore, epichlorohydrin rubber or ethylene-acrylic rubber is particularly preferable as the material of this layer 14 because such a rubber is excellent not only in cold resistance but also exhibits excellent resistance to heat, oil, weather and flame and, furthermore, can sufficiently withstand a constrictive force when formed into a tube. As to the cost of the material, epichlorohydrin rubber is marketed at a price only about one-tenth of that of fluorine rubber. The thickness of the outer layer 14 is made to range from about 0.5 mm to about 1.0 mm and preferably is not smaller than the thickness of the inner layer 12.

In the present invention, a well known type of fluorine rubber which is essentially a copolymer of hexafluoropropylene with vinylidene fluoride is the most suitable as the material for the inner layer 12. This fluorine rubber is essentially a fluorinated, non-crystallizing elastomer having a structure expressed by $$(CF_2-CH_2-\underset{\underset{CF_3}{|}}{CF}-CF_2)_n$$

and is commercially available as Viton (types A, B, C and E) of Dupont Co., Florel of 3M Co., Technoflon of Montedison Co. and Daiel of Daikin Kogyo Co. In contrast, Teflon used in the hose of the above quoted Japanese Utility Model Application Publication No. 49(1974)-7938 is a polymer of tetrafluoroethylene $(CF_2-CF_2)_n$ which has the ability to crystallize to a high degree and lacks rubbery resiliency or elastomericity. Of course, Teflon is never called rubber or regarded as a type of fluorine rubber. Thus, there is a fundamental difference between the present invention and Japanese Utility Model Application Publication No. 49-7938.

The following experiments are part of experimental work we have carried out with regard to interactions between sour gasoline and fluorine rubber.

EXPERIMENT 1

Figure 3:
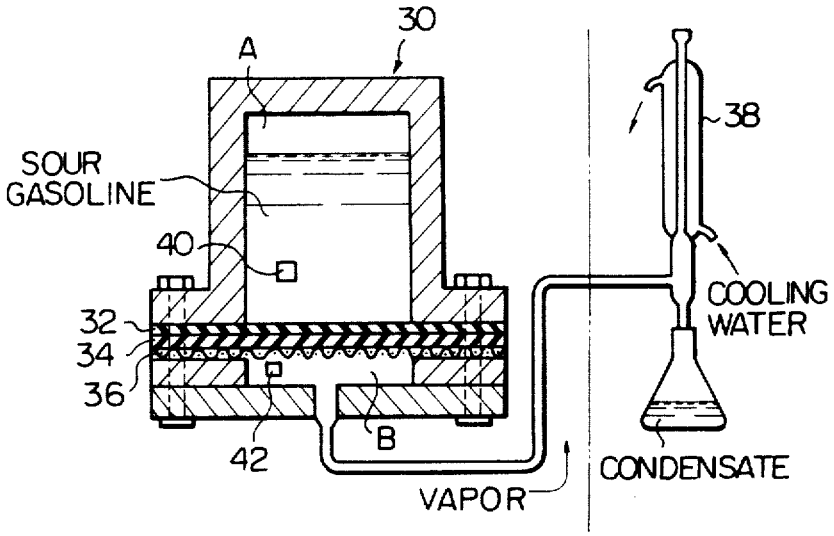
FIG. 3 is a schematic and sectional view of a testing apparatus used to examine the reaction of fluorine rubber to sour gasoline.

Referring to FIG. 3, chambers A and B of a testing apparatus 30 were partitioned by a fluorine rubber sheet 32 and an epichlorohydrin rubber sheet 34 with the fluorine rubber sheet 32 on the chamber A side. The fluorine rubber sheet 32 was essentially of a blend of Viton E-430 and Viton A (DuPont Co.) and had a thickness of either 0.3 mm or 0.5 mm. The epichlorohydrin rubber sheet 34 was 1.0 mm in thickness and was held in close contact with the fluorine rubber sheet 32 without being bonded thereto. As a mechanical support, there was a 24-mesh wire screen 36 beneath the epichlorohydrin rubber sheet 34.

The chamber A was charged with one liter of sour gasoline, which was brownish yellow in color and contained peroxides in a concentration of 10,000–20,000 ppm (as lauroyl peroxide). The chamber B was left vacant and connected to a condenser 38 to collect gasoline vapor permeated through the rubber sheets 32 and 34. Some specimens 40, 42 of the epichlorohydrin rubber sheet were disposed both in the sour gasoline in the chamber A and in the chamber B. In this state the testing apparatus 30 was kept in a constant temperature room maintained at 100° C. for a period of 336 hr, and a vapor permeated through the rubber sheets 32 and 34 and entered the chamber B was collected entirely as a condensate.

After the lapse of 336 hr, the apparatus 30 was cooled to room temperature and then disassembled to examine changes in physical properties of the epichlorohydrin rubber sheet 34 through which permeated the gasoline vapor and the rubber sheet specimens 40, 42 kept in the chambers A and B. At the same time, the condensate of the permeated vapor was weighed and subjected to analysis (by titration using potassium permanganate) of peroxide contained therein.

For comparison, this experiment was repeated except that the chambers A and B were partitioned in one case by the 0.5 mm fluorine rubber sheet 32 alone and in another case by a 2.0 mm thick epichlorohydrine rubber sheet (34) alone.

The results of Experiment I are presented in the following Tables 1, 2 and 3.

TABLE 1

| | Condensate of the permeated vapor | | |
|---|---|---|---|
| Partition | Quantity of condensate | Concentration of peroxides | Appearance |
| 0.3 mm fluorine rubber sheet (32) and 1.0 mm epichlorohydrin rubber sheet (34) | 70 g | 230 ppm | colorless and transparent |
| 0.5 mm fluorine rubber sheet (32) and 1.0 mm epichlorohydrin rubber sheet (34) | 40 g | 250 ppm | colorless and transparent |

TABLE 1-continued

| | Condensate of the permeated vapor | | |
|---|---|---|---|
| Partition | Quantity of condensate | Concentration of peroxides | Appearance |
| 0.5 mm fluorine rubber sheet alone | 40 g | 240 ppm | colorless and transparent |
| 2.0 mm epichlorohydrin rubber sheet alone | The rubber sheet 34 became very soft, sticky and creviced, so that the sour gasoline flowed into the chamber B. | | |

TABLE 2

| | Changes in physical properties of the epichlorohydrin rubber sheet (34) through which permeated the vapor | | |
|---|---|---|---|
| | Change in tensile strength | Change in elongation | Change in hardness |
| with 0.3 mm fluorine rubber sheet (32) thereon | −13% | −8% | ±0 |
| with 0.5 mm fluorine rubber sheet (32) thereon | +2% | −20% | +2 (by Shore hardness value) |
| no fluorine rubber sheet thereon | See Table 1. Measurement impossible. | | |

TABLE 3

| | Epichlorohydrin rubber specimens in the chambers A and B | |
|---|---|---|
| Partition | Specimens 40 in the chamber A | Specimens 42 in the chamber B |
| 0.3 mm fluorine rubber sheet (32) and 1.0 mm epichlorohydrin rubber sheet (34) | became very soft, sticky and creviced | no change perceptible |
| 0.5 mm fluorine rubber sheet (32) and 1.0 mm epichlorohydrin rubber sheet (34) | became very soft, sticky and creviced | no change perceptible |

EXPERIMENT 2

Specimens of the 1.0 mm thick epichlorohydrine rubber sheet were immersed in the condensate of the vapor permeated through the partition (rubber sheets 32, 34) in Experiment 1. In this state the liquid was maintained at a constant temperature of 60° C., and some of the rubber sheet specimens were taken out of the liquid after the lapse of 3 days, 7 days and 14 days to examine changes in the physical properties of the rubber sheet. The results are presented in Table 4.

TABLE 4

| | | 3 days | 7 days | 14 days |
|---|---|---|---|---|
| Condensate of the vapor permeated through 0.3 mm fluorine rubber sheet (32) and 1.0 mm epichlorohydrin rubber sheet (34) | Change in tensile strength | −2% | 0% | −2% |
| | Change in elongation | −16% | −26% | −29% |
| | Change in hardness (by Shore hardness value) | +1 | +2 | +2 |
| | Change in volume | −1.1% | −0.8% | −0.9% |
| | Change in weight | +1.2% | +1.4% | +1.5% |
| Condensate of the vapor permeated through 0.5 mm fluorine rubber sheet (32) and 1.0 mm | Change in volume | −0.6% | −2.6% | −1.3% |
| | Change in weight | +0.4% | −4.0% | −1.3% |

TABLE 4-continued

| | 3 days | 7 days | 14 days |
|---|---|---|---|
| epichlorohydrin rubber sheet (34) | | | |

For comparison, specimens of the same epichlorohydrin rubber sheet were immersed in a sour gasoline, in which the concentration of peroxide was about 10,000 ppm, and kept at 60° C. After the lapse of 3 days, changes in the physical properties of the specimens were as follows.

| | |
|---|---|
| Change in tensile strength | −37% |
| Change in elongation | −40% |
| Change in hardness | −21 by Shore hardness value |
| Change in volume | +35.5% |
| Change in weight | +13.2% |

After the lapse of 7 days, the rubber sheet specimens were so soft, sticky and creviced that it was impossible to accompish measurement of the above items.

The results of Experiments 1 and 2 clearly demonstrate that a fluorine rubber layer, even one as thin as 0.3 mm or 0.5 mm, exhibits a filtering or neutralizing activity to a sour gasoline vapor permeating therethrough, that this activity is specific to fluorine rubber (epichlorohydrine rubber does not exhibit such activity) and that a gasoline vapor permeated through the fluorine rubber layer is very low in the concentration of peroxide and hence is practically inactive with epichlorohydrin rubber which is an example of rubbers not resistant to sour gasoline but in other properties suitable for use in fuel hoses.

Referring again to FIG. 1, it is important that a firm bonding is established between the inner and outer layers 12 and 14. In this regard, one method of producing the two-ply rubber tube 10 is simultaneous extrusion of the inner and outer tubes 12 and 14. This method utilizes two sets of extruders so combined as to share a set of extrusion die assembly having concentrically arranged two annular orifices. One of the two extruders is connected to the inner orifice of the die and fed with fluorine rubber while the other extruder is connected to the outer orifice of the die and fed with the material of the outer layer 14 such as ethylene-acrylic rubber. The two extruders are operated simultaneously such that the inner and outer tubes 12 and 14 come into contact with each other while both the two kinds of rubbers are in plasticized state and are not yet exposed to the atmosphere. This method is efficient and has the advantage that a firm and reliable bonding of the two layers 12, 14 can be accomplished. In this method it is optional to add to the rubber material of the outer layer 14 a small amount of a conventional additive, which serves the function of augmenting an adhering property of the rubber, with the purpose of further ensuring a firm bonding of the outer layer 14 to the inner layer 12.

Although the above described simultaneous extrusion method is preferable, the two-ply rubber tube 10 can be produced also by a familiar two-stage extrusion method. In this case the inner tube 12 is formed by an ordinary extrusion technique as a first step, and then the outside of the inner tube 12 is coated with a thin layer of an adhesive, which may be a rubber. Thereafter the outer tube 14 is formed by extrusion so as to intimately cover the adhesive-coated inner tube 12. Optionally, the outside of the inner tube 12 may be processed prior to the adhesive coating so as to give a rough surface.

The two-ply rubber tube 10 is covered intimately with a tubular reinforcing layer 16 of a fibrous material. Since the role of this reinforcing layer 16 is to afford sufficient physical strength and heat resistance to the finished hose, it is preferable that this layer 16 takes the form of a braid of glass fiber which is highly resistant to heat, cotton fiber or a strong and relatively heat-resistant synthetic fiber such as polyester fiber, polaymide fiber or partially acetal-formed polyvinyl alcohol fiber (commonly called vinylon fiber in Japan). In the hose of FIG. 1, an outermost layer of the fuel hose is a tubular protective layer 18 of a synthetic rubber. The material of this layer 18 should be good at heat resistance, oil resistance, weather resistance and flame resistance. Accordingly ethylene-acrylic rubber, chloroprene rubber or epichlorohydrin rubber is preferable as the material of this layer 18. After completion of covering the reinforcing layer 16 with the protective layer 18, the entire hose is subjected to a vulcanization process in order to obtain a completely integrated laminated-structure.

Figure 2:
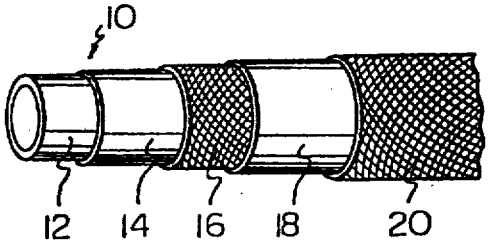
FIG. 2 shows, in a similar view, the addition of an outermost reinforcing layer to the hose of FIG. 1.

Referring to FIG. 2, it is optional that the protective layer 18 is further covered with a tubular reinforcing layer 20 which may be similar to the inner reinforcing layer 16 both in material and structure.

EXAMPLE

An automotive fuel hose having the construction of FIG. 1 was produced, using a fluorine rubber which was essentially a copolymer of hexafluoropropylene with vinylidene fluoride (a blend of Viton A-HV and Viton E-430 of DuPont) as the material of the innermost layer 12 and an epichlorohydrin rubber which was essentially a copolymer of epichlorohydrin with ethylene oxide (Hydrin 200 of Goodrich Co.) as the material of the outer layer 14 of the rubber tube 10. This two-ply rubber tube 10 was produced by the above described simultaneous extrusion method such that the inner layer 12 was 0.5 mm in thickness and the outer layer 14 was 1.0 mm. The tubular reinforcing layer 16 was a braid of vinylon fiber. The outer protective layer 18 was formed of the aforementioned epichlorohydrin rubber (Hydrin 200) to have a thickness of 1.0 mm.

The fuel hose produced in this example could pass severe qualification tests currently specified in the Japanese automobile industries.

This hose could readily be modified into the hose of FIG. 2 by the addition of the reinforcing layer 20 using a braid of, for example, vinylon fiber.

What is claimed is:

1. A hose for automotive fuel lines, comprising:

a two-ply rubber tube constituted of an inner layer of a copolymer of hexafluoropropylene with vinylidene fluoride which is resistant to hydrocarbon fuels including sour gasoline, formed by extrusion to serve as an innermost layer of the hose and an outer layer of a synthetic rubber selected from the group consisting of ethylene-acrylic rubber and epichlorohydrin rubber, which is less resistant to said fuels but has a better cold resistance than said fluorine rubber, formed by extrusion so as to bond to said inner layer, said inner layer having a thickness in the range from about 0.2 mm to about 0.7 mm, said outer layer having a thickness in the range from about 0.5 mm to about 1.0 mm and not smaller than the thickness of said inner layer;

a tubular reinforcing layer of a heat-resistant fibrous material intimately covering said outer layer; and a tubular protective layer of a synthetic rubber intimately covering said reinforcing layer.

2. A hose according to claim 1, wherein said two-ply rubber tube is produced by simultaneous extrusion of said inner layer and said outer layer such that the two kinds of rubbers for the respective layers come into direct contact with each other while the two types of rubbers are both in plasticized state.

3. A hose according to claim 2, wherein said synthetic rubber as the material of said outer layer contains an additive which serves the function of augmenting an adhering property of said synthetic rubber in plasticized state.

4. A hose according to claim 1, wherein said tubular reinforcing layer takes the form of a braided fabric.

5. A hose according to claim 4, wherein said fibrous material is glass fiber.

6. A hose according to claim 4, wherein said fibrous material is a synthetic fiber selected from the group consisting of polyester fiber, polyamide fiber and partially acetal-formed polyvinyl alcohol fiber.

7. A hose according to claim 4, wherein said fibrous material is cotton fiber.

8. A hose according to claim 4, wherein said synthetic rubber as the material of said protective layer is selected from the group consisting of ethylene-acrylic rubber, chloroprene rubber and epichlorohydrin rubber.

*9. A hose for automotive fuel lines, comprising:*

*a two-ply rubber tube constituted of an inner layer of a copolymer of hexafluoropropylene with vinylidene fluoride which is resistant to hydrocarbon fuels including sour gasoline, formed by extrusion to serve as an innermost layer of the hose and an outer layer of a synthetic rubber selected from the group consisting of ethylene-acrylic rubber and epichlorohydrin rubber, which is less resistant to said fuels but has a better cold resistance than said fluorine rubber, formed by extrusion so as to bond to said inner layer, said inner layer having a thickness in the range from about 0.2 mm to about 0.7 mm, said outer layer having a thickness not smaller than the thickness of said inner layer:*

*a tubular reinforcing layer of a heat-resistant fibrous material intimately covering said outer layer; and*

*a tubular protective layer of a synthetic rubber intimately covering said reinforcing layer.*

*10. A hose for automotive fuel lines, comprising:*

*a two-ply rubber tube constituted of an inner layer of a copolymer of hexafluoropropylene with vinylidene fluoride which is resistant to hydrocarbon fuels including sour gasoline, formed by extrusion to serve as an innermost layer of the hose and an outer layer of a synthetic rubber selected from the group consisting of ethylene-acrylic rubber and epichlorohydrin rubber, which is less resistant to said fuels but has a better cold resistance than said fluorine rubber, formed by extrusion so as to bond to said inner layer, said inner layer having a thickness in the range from about 0.2 mm to about 0.7 mm, said outer layer having thickness of at least 0.5 mm and not smaller than the thickness of said inner layer;*

*a tubular reinforcing layer of a heat-resistant fibrous material intimately covering said outer layer; and*

*a tubular protective layer of a synthetic rubber intimately covering said reinforcing layer.*

* * * * *

UNITED STATES PATENT AND TRADEMARK OFFICE

CERTIFICATE OF CORRECTION

PATENT NO. : RE 32,230

DATED : August 26, 1986

INVENTOR(S) : Seikoh SATOH and Tadashi SUZUKI

It is certified that error appears in the above-identified patent and that said Letters Patent is hereby corrected as shown below:

IN THE TITLE PAGE:

Item [73] should read:

-- Nissan Motor Co., Ltd., Yokohama, Japan, and
Togawa Rubber Manufacturing Co., Ltd., Osaka, Japan. --

Signed and Sealed this

Tenth Day of February, 1987

*Attest:*

DONALD J. QUIGG

*Attesting Officer*

*Commissioner of Patents and Trademarks*